United States Patent
Yeon

[19]
[11] Patent Number: 6,154,436
[45] Date of Patent: Nov. 28, 2000

[54] DISC DRIVE HAVING A SELF-ADJUSTING TURNTABLE

[75] Inventor: Cheol-sung Yeon, Suwon, Rep. of Korea

[73] Assignee: Samsung Electronics Co., Ltd., Suwon, Rep. of Korea

[21] Appl. No.: 09/001,663

[22] Filed: Dec. 31, 1997

[30] Foreign Application Priority Data

Jun. 13, 1997 [KR] Rep. of Korea .................... 97-24428

[51] Int. Cl.[7] .................................................. G11B 25/04
[52] U.S. Cl. .................................................... 369/271
[58] Field of Search .................. 360/99.05, 99.08, 360/96.03, 133; 369/264, 265, 266, 267, 269, 270, 271, 258, 263, 242, 292, 290

[56] References Cited

U.S. PATENT DOCUMENTS

| | | | |
|---|---|---|---|
| 1,281,507 | 10/1918 | Burks | 464/38 |
| 3,584,474 | 6/1971 | Church | 464/156 |
| 3,674,278 | 7/1972 | Bowerman | 369/242 |
| 4,631,620 | 12/1986 | Oishi et al. | 360/133 |
| 5,072,438 | 12/1991 | Suzuki et al. | 369/290 |
| 5,193,084 | 3/1993 | Christiaens | 369/258 |
| 5,432,582 | 7/1995 | Horning et al. | 396/612 |
| 5,490,020 | 2/1996 | Albrecht et al. | 360/96.3 |

*Primary Examiner*—David L. Ometz
*Assistant Examiner*—Angel Castro
*Attorney, Agent, or Firm*—Staas & Halsey LLP

[57] ABSTRACT

A disc drive includes a motor and a turn table mounted on a shaft of the motor to be driven thereby. The turn table includes a lower drive member driven by the motor, and a positioning member mounted on the drive member. The positioning member includes a top surface on which the disc is mounted. The positioning member and drive member form a concave/convex interface, enabling the positioning member to float relative to the drive member to a position wherein the top surface (and disc) is oriented horizontally, even if the drive member becomes tilted relative to the shaft. The interface includes interengaging ridges and grooves to minimize friction and produce a positive rotary drive from the drive member to the positioning member.

22 Claims, 4 Drawing Sheets

DISC DRIVE HAVING A SELF-ADJUSTING TURNTABLE

BACKGROUND OF THE INVENTION

1. Field of the Invention

The present invention relates to a disc drive having a motor-driven turntable.

2. Description of the Prior Art

In general, a disc is used as a recording medium for recording information on, and reproducing information from, spiral or concentric tracks thereof. The information recorded on the disc is reproduced by pick-up feeding means including a motor and a plurality of gear trains which are driven and rotated by the motor, and an optical pick-up device which is linearly moved by the pick-up feeding means in a radial direction of the disc.

The disc is rotated by a disc drive when the optical pick-up device is moved. Referring to FIGS. 1 and 2, a conventional disc drive includes a deck base 10, a spindle motor 12 which is installed on the upper surface of the deck base and has a rotary shaft 12a which is engaged with the disc D to rotate the disc D, a turn table 14 on which the disc D is positioned such that non-magnetized portions thereof make contact with the turn table 14, and a clamp (not shown) which is engaged with non-magnetized portions of the disc D positioned on the upper surface of the turn table 14 to prevent deviation of the disc D.

A bracket (not shown) installed at the lower outer peripheral portion of the spindle motor 12 helps to apply current to the spindle motor 12. Two guide members (not shown) are fixed in parallel to each other under the spindle motor 12 and guide the optical pick-up device when the optical pick-up device is moved by the pick-up feeding means.

The spindle motor 12 is press-fitted and installed in the deck base 10, and then the turn table 14 is installed at the upper portion of the rotary shaft 12a of the spindle motor 12 such that it is coaxial to the rotary shaft 12a of the spindle motor 12. The disc is positioned on the turn table 14 and is rotated when current is applied to the spindle motor 12.

The optical pick-up device records and reproduces information on and from the rotating disc when it moves under the disc, and is guided by the parallel guide members.

In the above-mentioned conventional disc drive, however, in case the turn table is tilted, that is, the turn table is not coaxial to the rotary shaft of the spindle motor, then the horizontality of the disc cannot be accurately maintained. As a result, the disc is shaken and deviated during the rotation thereof, and laser beams cannot be projected to desired recording pits of the disc.

SUMMARY OF THE INVENTION

Therefore, it is an object of the present invention to provide a disc drive with a self-compensating turn table which automatically keeps the disc horizontal even if a lower portion of the run table fixed to the rotary shaft is tilted in conjunction with the rotary shaft, thereby minimizing shaking of the disc.

The present invention relates to a disc drive adapted to rotate a disc. The disc drive includes a spindle motor and a turn table mounted on a vertical shaft of the spindle motor to be driven thereby. The turn table includes a lower drive member having an upper surface. The turn table also includes an upper positioning member having a lower surface seated on the upper surface. The upper positioning member includes a top surface adapted to support a disc. A clamp is adapted for retaining the disc on the top surface. The lower surface and upper surface form a generally concave/convex interface therebetween, causing the positioning member to automatically slide upon the drive member to a position wherein the top surface remains horizontal even if the drive member becomes tilted in conjunction with the shaft.

At least one of the upper and lower surfaces, but preferably both thereof, is comprised of alternating ridges and grooves.

If both of the upper and lower surfaces are comprised of alternating ridges and grooves, then the grooves are engaged within the ridges. At least some of the ridges are spaced from their respective grooves to form air gaps therebetween.

The shaft preferably includes a radially outward projection. The positioning member includes a radially inwardly projecting, movement-restricting boss captured beneath the projection, for permitting limited movement of the positioning member relative to the drive member.

The upper and lower surfaces of the drive member and positioning member, respectively, are coated with an anti-friction material.

BRIEF DESCRIPTION OF THE DRAWINGS

The above object and other advantages of the present invention will become more apparent from preferred embodiments thereof described with reference to the attached drawings in which.

DESCRIPTION OF A PREFERRED EMBODIMENT

Figure 1:
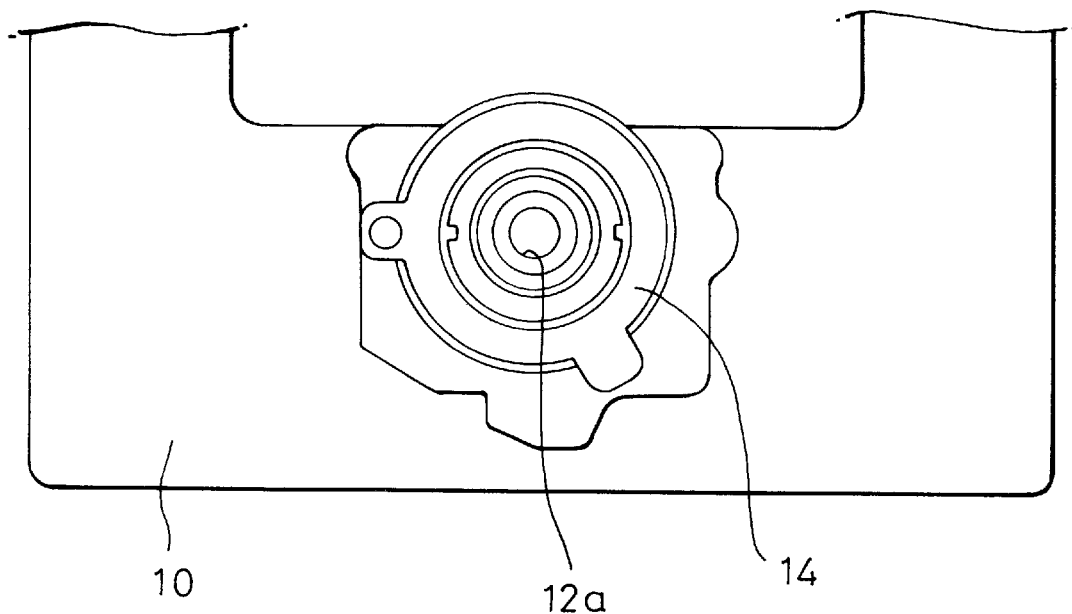
FIG. 1 is a plan view for schematically showing a conventional disc drive.
Figure 2:
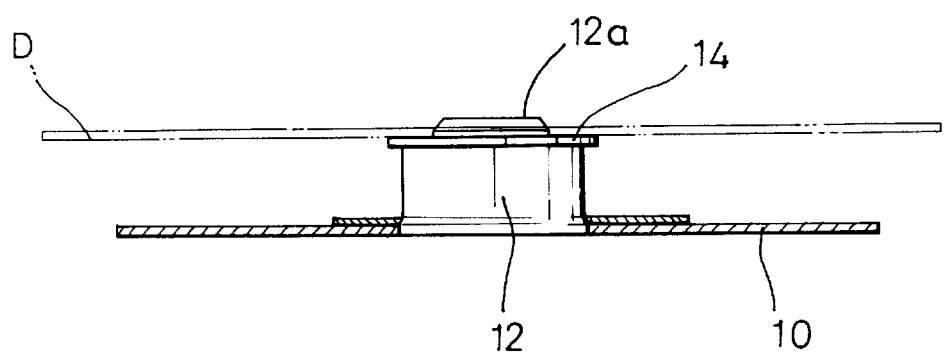
FIG. 2 is a side sectional view of the disc drive shown in FIG. 1.
Figure 3:
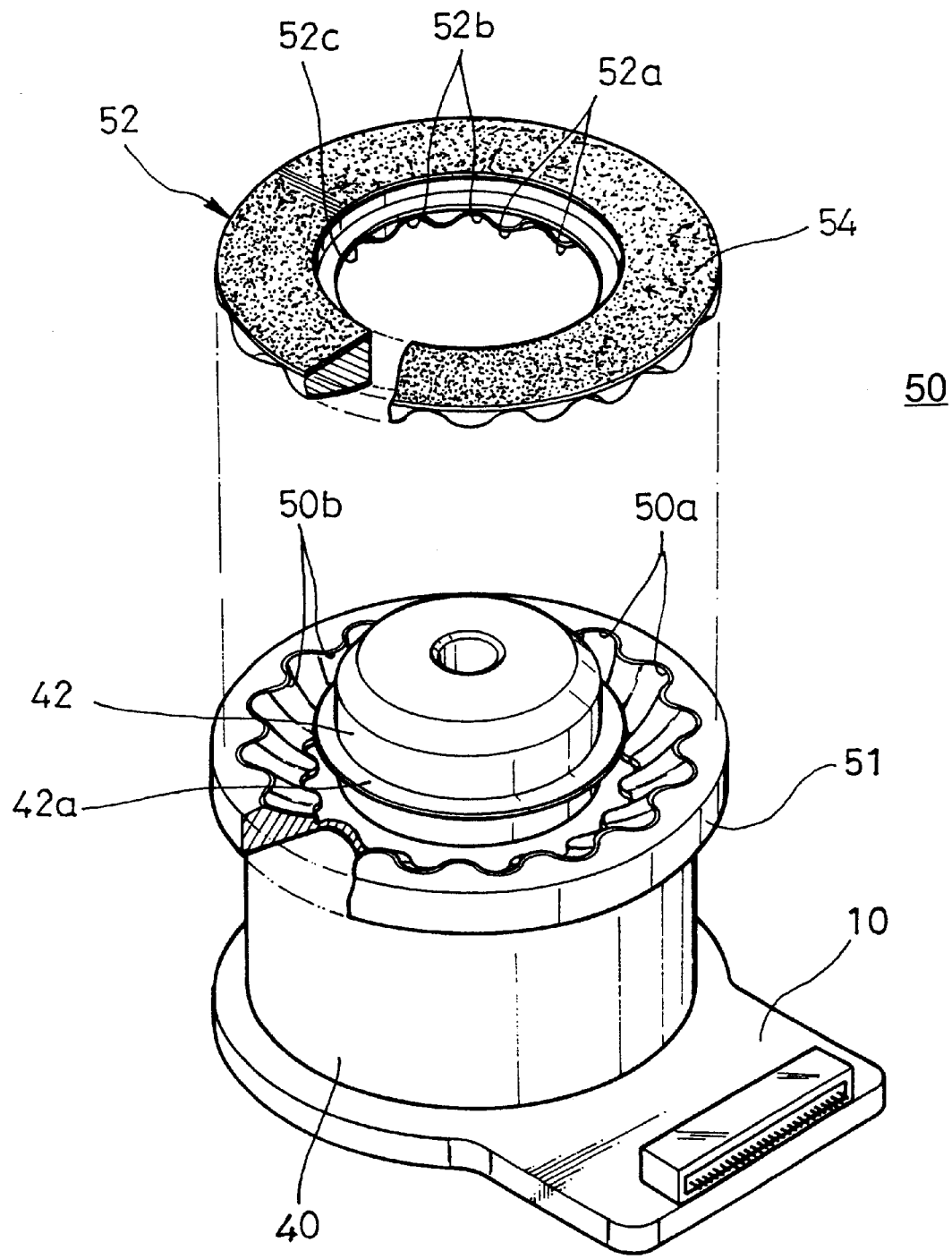
FIG. 3 is an exploded view for showing a disc drive according to a preferred embodiment of the present invention.
Figure 4A:
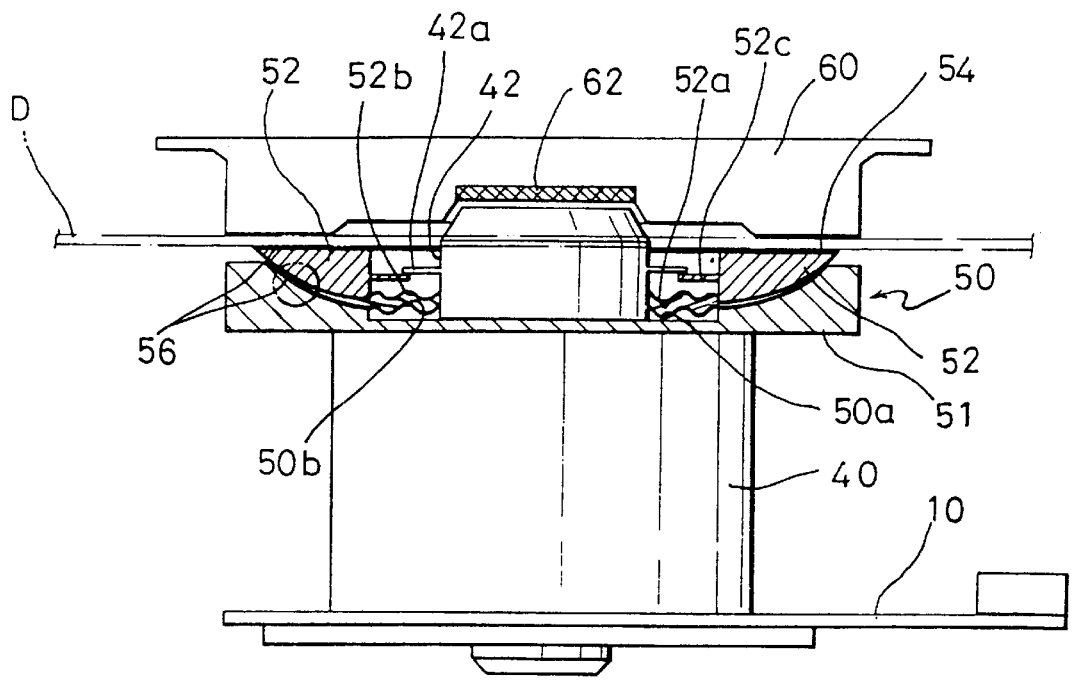
FIG. 4A is a side sectional view of the disc drive shown in FIG. 3.
Figure 4B:
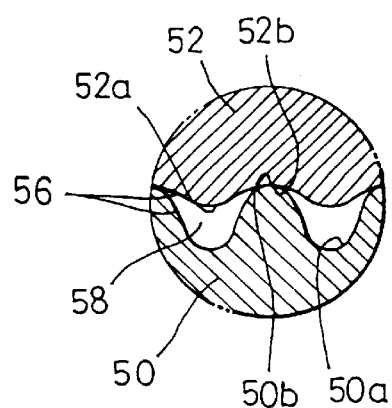
FIG. 4B is an enlarged view of an encircled fragment of FIG. 4A.

Hereinafter, a disc drive with a self-compensating turn table according to a preferred embodiment of the present invention will be explained in detail with reference to FIGS. 3 through 4B.

A spindle motor 40 for rotating a disc D is installed on a deck base 10, and a bracket (not shown) is attached to the spindle motor 40 at an outer peripheral portion thereof.

A turn table 50 includes a lower portion or drive member 51, and an upper portion or positioning member 52 which is able to float relative to the drive member 51. The drive member 51 is engaged with the upper portion of a rotary shaft 42 of the spindle motor 40, to be driven thereby. An annular protrusion 42a (or alternatively, spaced apart protrusions) projects radially outwardly from the outer peripheral surface of the rotary shaft 42. Upwardly open grooves 50a and upwardly projecting ridges 50b are formed in an alternating relationship on the upper surface of the drive member 51, and are curved downwardly toward the inner and lower side of the drive member 51, whereby the upper surface of the drive member 51 is generally concave.

The disc is positioned on the positioning member 52 which, as will be explained below, compensates for a fitting of the drive member 51, and prevents the disc from shaking during rotation. The positioning member 52 has a generally convex lower surface defined by downwardly projecting ridges 52a and downwardly open grooves 52b formed in an alternating relationship thereon. A movement restriction boss 52c for restricting the movement of the positioning member 52 relative to the drive member 51 within prescribed limits protrudes radially inwardly from the inner surface of the positioning member 52 so as to be retained beneath the annular protrusion 42a of the rotary shaft 42. A slip-preventing coating 54 for preventing the disc from slipping during the rotation thereof is applied to the top surface of the positioning member 52.

On the other hand, an anti-friction material such as Teflon 56 for reducing the frictional forces between the drive member 51 and the positioning member 52, is coated on the grooves 50a and 52b and the ridges 50b and 52a that are formed on the drive member 51 and the positioning member 52. Air gaps 58 are formed between the grooves 50a of the drive member 51 and the ridges 52a of the positioning member 52, as can be seen in FIG. 4B whereby the amount of frictional contact between the members 51, 52 is minimized.

A clamp 60 for preventing the deviation of the disc D is chucked on the non-magnetized portions of the disc D. A magnet 62 is preferably mounted to the clamp 60 and provides a chucking force.

Figure 5:
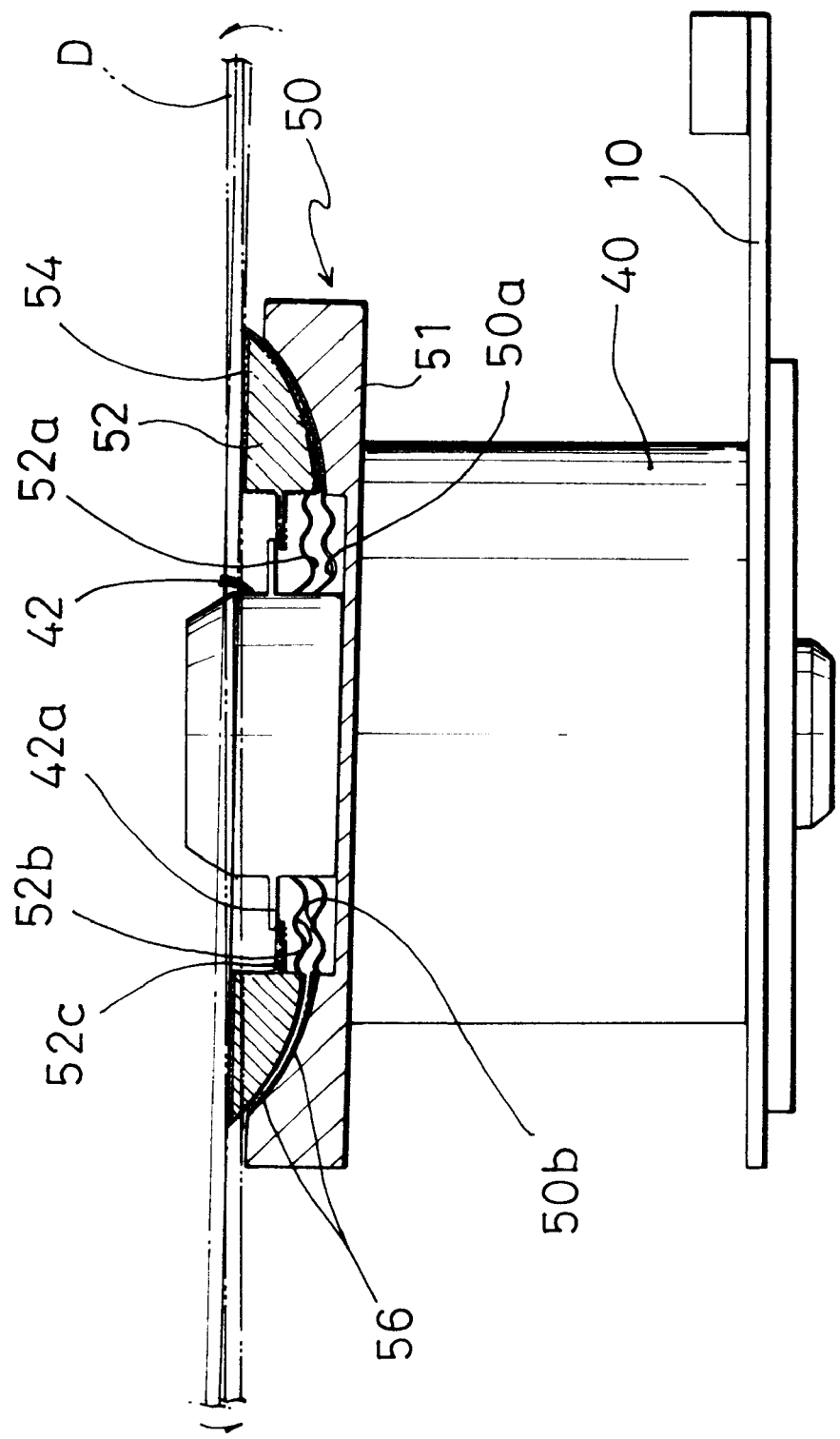
FIG. 5 is a view for illustrating the operation of the disc drive according to the preferred embodiment of the present invention.

Hereinafter, the operation of the disc drive with a self-compensating turn table according to the present invention will be explained in detail with reference to FIG. 5.

The spindle motor 40 is installed on the upper portion of the deck base 10, and the positioning member 52 is positioned on the upper portion of the drive member 51 in engagement with the rotary shaft 42 of the spindle motor 40. As that occurs, the movement restriction boss 52c, and/or the annular protursion 42a, flexes so as to enable the boss 52c to be snapped into position beneath the projection 42a. Also, the ridges 50b formed on the drive member 51 are in surface-contact with the bottoms of the grooves 52b (see FIG. 4B).

After the non-magnetized portions of the disc D are positioned on the slip preventing coating 54 disposed on the top surface of the positioning member 52, the disc is chucked by the clamp 60. Then, when the spindle motor 40 is actuated, the drive member 51 and the positioning member 52 are rotated together with the disc D, and any tilting of the drive member 51 is automatically compensated for, as explained below.

That is, if the drive member 51 becomes tilted in conjuction with the shaft 42, i.e., becomes non-coaxial with the positioning member 52, and is rotated at a high RPM, the positioning member 52 automatically shifts along its concave/convex interface with the drive member 51 in a direction opposite to the tilt of the drive member 51. That is, the grooves 52b of the positioning member 52 slide in surface-contact with the ridges 50b formed on the drive member 51. Thus, the top surface of the positioning member 52 remains horizontal, and thereby prevents shaking of the disc.

Movement restriction boss 52c of the positioning member 52 is retained by the annular protrusions 42a, thereby restricting the movement of the positioning member 52. The boss 52c and/or the annular protrusion 42a are sufficiently flexible to permit the positioning member 52 to float upon the drive member 51 to a limited extent but sufficient to compensate for slight tilting of the drive member 51. Further, the frictional forces between the grooves 50a, 52b and the ridges 50b, 52a are minimized by the presence of the air gaps 58 therebetween, and thus the positioning member 52 moves smoothly. The engagement between the ridges of the drive member 51 and positioning member 52 constitutes a positive drive transmitting structure for transmitting rotation from the turn table to the positioning member 52.

As described above, according to the disc drive of the present invention, in the event that the drive member becomes tilted in conjunction with the rotary shaft, the horizontality of the disc is automatically maintained (the disc is maintained in a fixed initial plane) by a shifting of the positioning member relative to the drive member. Thus, shaking of the disc during the rotation of the disc can be minimized so that laser beams can be accurately projected to desired positions of the recording pits of the disc.

Although the preferred embodiment of the invention has been described, it is understood that the present invention should not be limited to this preferred embodiment, but various changes and modifications can be made by one skilled in the art within the spirit and scope of the invention as hereinafter claimed. For example, the concave-convex interface between the upper surface of the turn table 50 and the lower surface of the positioning member 52 could be reversed, whereby the lower surface is generally concave, and the upper surface is generally convex.

What is claimed is:

1. A disc drive to rotate a disc, comprising:
    a spindle motor having a vertical shaft;
    a turn table mounted on the vertical shaft of the spindle motor to be driven thereby, the turn table including
    a lower drive member driven by the spindle motor and including an upper surface, and
    an upper positioning member including a lower surface seated on the upper surface to float movement relative thereto, the positioning member including a top surface to support the disc; and
    a clamp to retain the disc on the top surface;
    wherein the lower surface and upper surface form a generally concave/convex interface therebetween, causing the positioning member to automatically slide upon the drive member to a position wherein the top surface remains horizontal even if the drive member and the vertical shaft become tilted.

2. The disc drive according to claim 1, wherein the lower surface includes a downward projection, and the upper surface includes an upward projection engageable with the downward projection, to transmit rotation from the turn table to the positioning member.

3. The disc drive according to claim 2, wherein the upward and downward projections are formed by generally radially extending ridges.

4. The disc drive according to claim 1, wherein the upper surface is generally concave, and the lower surface is generally convex.

5. The disc drive according to claim 4, wherein at least one of the upper and lower surfaces comprises alternating ridges and grooves.

6. The disc drive according to claim 5, wherein both of the upper and lower surfaces comprise alternating ridges and grooves, the ridges of the upper surface being engaged in the grooves of the lower surface, and the ridges of the lower surface being engaged in the grooves of the upper surface.

7. The disc drive according to claim 6, wherein at least some of the ridges are spaced from their respective engaged grooves, to form air gaps therebetween.

8. The disc drive according to claim 7, wherein the upper and lower surfaces are coated with an anti-friction material.

9. The disc drive according to claim 6, wherein:

the shaft includes a radially outward projection; and the positioning member includes a radially inwardly projecting movement restriction boss captured beneath the projection, to permit a limited amount of movement of the positioning member relative to the drive member.

10. The disc drive according to claim 1, wherein at least one of the upper and lower surfaces comprises alternating ridges and grooves.

11. The disc drive according to claim 10, wherein both of the upper and lower surfaces comprise alternating ridges and grooves, the ridges of the upper surface being engaged in the grooves of the lower surface, and the ridges of the lower surface being engaged in the grooves of the upper surface.

12. The disc drive according to claim 11, wherein at least some of the ridges are spaced from their respective engaged grooves, to form air gaps therebetween.

13. The disc drive according to claim 1, wherein:

the shaft includes a radially outward projection; and the positioning member includes a radially inwardly projecting movement restriction boss captured beneath the projection, to permit a limited amount of movement of the positioning member relative to the turn table.

14. The disc drive according to claim 1, wherein the upper and lower surfaces are coated with an anti-friction material.

15. A disc drive to rotate a disc comprising:

a spindle motor having a shaft;

a turn table mounted on and driven by said shaft, to support the disc in a fixed plane even as an angle between said shaft and the fixed plane changes, wherein said turnatable comprises a drive member engaged with and driven by said shaft, and a positioning member mounted on said drive member and slidable with respect to said drive member, said positioning member supporting the disc in the fixed plane even as said drive member and said shaft tilt relative to the fixed plane.

16. The disc drive as claimed in claim 15, wherein the fixed plane is a horizontal plane.

17. The disc drive as claimed in claim 15, wherein:

said drive member includes an upper surface; and said positioning member has a lower surface seated on the upper surface and a top surface to support the disc, the upper surface having a concave or convex surface and the lower surface having the concave or convex surface opposite to that of the upper surface.

18. The disc drive as claimed in claim 17, wherein:

the lower surface has first alternating grooves and ridges extending radially; and the upper surface has second alternating grooves and ridges extending radially, wherein the first ridges of the lower surface engage in respective ones of the second grooves of the upper surface and the second ridges of the upper surface engage in respective ones of the first grooves of the lower surface, to transmit rotation from said drive member to said positioning member.

19. The disc drive as claimed in claim 18, wherein one of the first and second alternating grooves and ridges have amplitudes greater than the other one of the first and second alternating grooves and ridges.

20. The disc drive as claimed in claim 18, wherein:

said shaft includes a first projection extending radially from an outer circumference thereof;

said positioning member includes a second projection extending radially from an inner circumference thereof; and said first projection contacting said second projection when said positioning member reaches a predetermined angle relative to said shaft, to limit movement of said positioning member with respect to said driving member.

21. The disc drive as claimed in claim 17, wherein the upper and lower surfaces are coated with an anti-friction material.

22. The disc drive as claimed in claim 15, wherein:

said shaft includes a first projection extending radially from an outer circumference thereof;

said positioning member includes a second projection extending radially from an inner circumference thereof; and said first projection contacting said second projection when said positioning member reaches a predetermined angle relative to said shaft, to limit movement of said positioning member with respect to said driving member.

\* \* \* \* \*